United States Patent
Simonot et al.

(10) Patent No.: US 7,135,517 B2
(45) Date of Patent: Nov. 14, 2006

(54) RUBBER COMPOSITION BASED ON DIENE ELASTOMER AND A REINFORCING SILICON NITRIDE

(75) Inventors: Laure Simonot, Greenville, SC (US); Arnaud Lapra, Clermont-Ferrand (FR); Anne Veyland, Marsat (FR); Emmanuel Custodero, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/025,081

(22) Filed: Dec. 30, 2004

(65) Prior Publication Data

US 2005/0171264 A1   Aug. 4, 2005

Related U.S. Application Data

(63) Continuation of application No. PCT/EP03/06802, filed on Jun. 27, 2003.

(30) Foreign Application Priority Data

Jul. 1, 2002   (FR)   .................................. 02 08279

(51) Int. Cl.
    *A63B 37/00*   (2006.01)
(52) U.S. Cl. .................................................. 524/433
(58) Field of Classification Search ................ 524/433
    See application file for complete search history.

(56) References Cited

U.S. PATENT DOCUMENTS

| 4,714,734 | A | * | 12/1987 | Hashimoto et al. | ......... 524/496 |
| 5,852,099 | A |   | 12/1998 | Vanel |  |
| 6,121,346 | A | * | 9/2000  | Visel et al. | ................. 523/200 |
| 6,469,089 | B1| * | 10/2002 | Wang et al. | ................. 524/492 |

FOREIGN PATENT DOCUMENTS

| JP | 60-258235 | 12/1985 |
| JP | 02-135241 | 8/1990 |

* cited by examiner

*Primary Examiner*—Peter D. Mulcahy
(74) *Attorney, Agent, or Firm*—Buchanan Ingersoll & Rooney PC (57) ABSTRACT

A rubber composition usable for the manufacture of tires, based on at least one diene elastomer, at least one reinforcing inorganic filler and at least one coupling agent providing a bond between the inorganic filler and the elastomer. The reinforcing inorganic filler includes a silicon nitride having the following characteristics:
 (a) a BET specific surface area of between 20 and 200 $m^2/g$;
 (b) an average particle size (by mass), $d_w$, of between 10 and 350 nm.

The rubber composition may be used for the manufacture of rubber articles, in particular of tires or semi-finished products made of rubber intended for tires, in particular of treads.

40 Claims, 2 Drawing Sheets

RUBBER COMPOSITION BASED ON DIENE ELASTOMER AND A REINFORCING SILICON NITRIDE

CROSS REFERENCE TO RELATED APPLICATION

This application is a continuation of PCT Application No. PCT/EP2003/006802, filed Jun. 27, 2003, published in French as WO 2004/003067 on Jan. 8, 2004 which claims priority of French Application No. 02/08279 filed Jul. 1, 2002.

FIELD OF THE INVENTION

The present invention relates to diene rubber compositions usable for the manufacture of tires or semi-finished products for tires, in particular of treads for these tires, and to the reinforcing fillers capable of reinforcing such rubber compositions.

BACKGROUND OF THE INVENTION

So as to reduce fuel consumption and the pollution emitted by motor vehicles, major attempts have been made by tire designers to obtain tires having all of the following: very low rolling resistance, improved adhesion both on dry ground and on wet or snow-covered ground, and very good wear resistance.

Numerous solutions have thus been proposed to lower the rolling resistance and to improve the adhesion of tires, but these generally result in a very great decline in the wear resistance. In particular, it is well known that although the incorporation of conventional white fillers such as, for example, conventional silicas or aluminas, chalk, talc, clays such as bentonite or kaolin, in rubber compositions used for the manufacture of tires and in particular of treads, does result in a reduction in the rolling resistance and an improvement in adhesion to wet, snow-covered or icy ground, it also results in an unacceptable decline in the wear resistance, linked to the fact that these conventional white fillers do not have a sufficient reinforcement ability with respect to such rubber compositions. For this reason, these white fillers are generally referred to as non-reinforcing fillers, also referred to as inert fillers.

One effective solution to this problem has been described in particular in patent applications EP-A-0 501 227, EP-A-0 735 088 or WO99/02602, which disclose diene rubber compositions reinforced with precipitated silicas of high dispersibility (so-called "HD" silicas, for "highly dispersible silica"), which make it possible to manufacture treads having a significantly improved rolling resistance, without adversely affecting the other properties, in particular those of grip, endurance and in particular wear resistance. Other compositions having such a compromise of contradictory properties are also described in applications EP-A-0 810 258 and WO99/02602, with specific aluminous fillers of high dispersibility as reinforcing white fillers.

However, the rubber compositions that contain these specific white fillers, even when they are of the highly dispersible type, remain more difficult to work ("processability") than rubber compositions filled conventionally with carbon black, because for reasons of mutual attraction, these white filler particles have an irritating tendency to agglomerate together within the elastomeric matrix. These interactions tend to increase the consistency of the compositions in the uncured state and therefore to make them more difficult to work than in the presence of carbon black; they also have the consequence of limiting the dispersion of the filler and hence the reinforcing properties to a substantially lower level than that which it would be theoretically possible to achieve if all the (white filler/elastomer) bonds that could be created during the thermomechanical kneading operations were in fact obtained.

Furthermore, these inorganic fillers of the siliceous or aluminous type also have the known drawback of significantly disrupting the vulcanization kinetics of the elastomeric compositions, compared with conventional compositions filled with carbon black. In particular, in the case of silicas, it is known that the resulting longer curing times may adversely affect the industrial processing of the elastomeric compositions, like that of the rubber articles containing them.

SUMMARY OF THE INVENTION

Now, the Applicants have discovered during their research that there are specific inorganic fillers, other than those mentioned above, which can also be used in the rubber compositions as true reinforcing fillers, that is to say, are capable of replacing conventional carbon blacks for tires. Unexpectedly, these specific inorganic fillers offer not only excellent processing ability to the rubber compositions containing them, but also very great dispersibility, both similar to those available with carbon blacks.

Consequently, a first subject of the invention relates to a rubber composition based on at least (i) one diene elastomer, (ii) one reinforcing inorganic filler, (iii) one coupling agent providing the bond between the reinforcing filler and the elastomer, characterized in that said inorganic filler comprises a silicon nitride (hereafter referred to as "reinforcing silicon nitride") having the following characteristics:
 (a) a BET specific surface area of between 20 and 200 $m^2/g$;
 (b) an average particle size (by mass), ($d_w$), of between 10 and 350 nm.

Traditionally, it is known that silicon nitrides have been used essentially in the treads of tires to improve grip on snow-covered or icy ground (see for example JP-A-1985/258235, JP-A-1987/198503, JP-A-1990/135241). In these documents, the particles of silicon nitride, which are chosen for their coarse size and their very great hardness, have the function not of reinforcement, but of improving the grip by a well-known "claw" effect on snow or ice. Silicon nitrides have also been used to improve the thermal conductivity of various types of materials, in particular membranes of tire curing moulds such as described in JP-A-1986/040114. Here too, the size of the particles of silicon nitride is coarse. It is also essential to note that these conventional silicon nitrides are always added to rubber compositions which furthermore contain a true reinforcing filler such as carbon black and/or silica.

The subject of the invention is also a process for obtaining a rubber composition usable for the manufacture of tires, in which there are incorporated in at least one diene elastomer, at least one reinforcing inorganic filler and one coupling agent providing the bond between the reinforcing inorganic filler and the elastomer, this process being characterized in that said inorganic filler comprises a silicon nitride having the following characteristics:
 (a) a BET specific surface area of between 20 and 200 $m^2/g$;
 (b) an average particle size (by mass), $d_w$, of between 10 and 350 nm, and in that the entire mixture is kneaded thermomechanically, in one or more stages, until a maximum temperature of between 110° C. and 190° C. is reached.

Another subject of the invention is the use of a composition according to the invention for the manufacture of finished articles or semi-finished products, and also these finished articles and semi-finished products themselves, comprising a rubber composition according to the invention, these articles or products being intended for any ground contact system for automobiles, such as tires, internal safety supports for tires, wheels, rubber springs, elastomeric articulations and other suspension and anti-vibration elements.

A very particular subject of the invention is the use of a composition according to the invention for the manufacture of tires or semi-finished rubber products intended for such tires, these semi-finished articles being selected in particular from the group comprising treads, underlayers intended for example to be positioned beneath these treads, crown reinforcement plies, sidewalls, carcass reinforcement plies, beads, protectors, inner tubes and airtight internal rubbers for tubeless tires.

One particular subject of the invention is tires comprising an elastomeric composition according to the invention and intended to be fitted on passenger vehicles, 4×4 vehicles (having 4 driving wheels), SUVs ("Sport Utility Vehicles"), two-wheeled vehicles (in particular bicycles or motorcycles), such as industrial vehicles selected from among vans, "heavy vehicles"—i.e., subway trains, buses, road transport machinery (lorries, tractors, trailers), off-road vehicles, agricultural machinery or construction machinery, aircraft and other transport or handling vehicles.

The invention relates in particular to treads for tires, these treads being able to be used in the manufacture of new tires or for retreading worn tires; owing to the compositions of the invention, these treads have all of the following: low rolling resistance, very good grip and high wear resistance.

Another subject of the invention is the use, as reinforcing filler, of a reinforcing silicon nitride as defined above in a diene rubber composition.

Finally, another subject of the invention is a process for reinforcing a diene rubber composition, characterized in that a reinforcing silicon nitride as defined above is incorporated in this composition in the uncured state by thermomechanical kneading.

The invention and its advantages will be readily understood in the light of the description and the example of embodiment which follow.

DETAILED DESCRIPTION OF PREFERRED EMBODIMENTS

I. Measurements and Test Used

I-1. Characterization of the Reinforcing Fillers

The fillers described hereafter comprise in known manner agglomerates of particles, which are liable to disagglomerate into these particles under the effect of an external force, for example under the action of mechanical working or ultrasound. The term "particle" used in the present application must be understood in its usual generic sense of "aggregate" (also referred to as "secondary particle"), and not in that of a possible elementary particle (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These fillers are characterized as indicated hereafter.

a) BET Specific Surface Area:

The BET specific surface area is determined by adsorption of gas using the method of Brunauer-Emmett-Teller described in "The Journal of the American Chemical Society" Vol. 60, page 309, February 1938), more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

b) Average Particle Size $d_w$:

The average size (by mass) of the particles, $d_w$, is measured conventionally after ultrasound dispersion of the filler to be analyzed in demineralized water.

Measurement takes place using an X-ray detection centrifugal sedimentometer type "XDC" ("X Ray Disc Centrifuge Sedimentometer"), sold by Brookhaven Instruments, a known device used in particular for characterizing particles of silica.

The operating method is as follows. A suspension is produced of 1 to 4 g (for example, 1.7 g is suitable) of a sample of the filler to be analyzed in 40 ml of water, by action over 8 minutes, at 60% power (60% of the maximum position of the "output control"), of a 1500 W ultrasound probe (Vibracell ¾-inch ultrasound generator sold by Bioblock under the reference M75450). To limit heating during ultrasound generation, the suspension is preferably placed in a bath of cold water (for example at a temperature of 5 to 10° C.). After ultrasound generation, 15 ml of the suspension is introduced into the rotating disc; after sedimentation for 120 minutes, the mass distribution of the particle sizes and the average size by mass of the particles $d_w$ are calculated in known manner by the software of the "XDC" sedimentometer ($d_w = \Sigma(n_i\, d_i^5)/\Sigma(n_i\, d_i^4)$ where $n_i$=number of objects of the size class or diameter $d_i$)

c) Disagglomeration Rate: α:

The disagglomeration rate (α) is measured in what is called the "ultrasound disagglomeration test", at 15% power of a 600-W (watt) probe operating here in pulse mode (namely 1 second "ON", 3 seconds "OFF") to avoid heating of the ultrasound probe during measurement. This test of known principle, which is in particular the subject of patent application WO 99/28376, makes it possible to measure continuously the change in the average size (by volume) of the agglomerates of particles during ultrasound generation (see WO99/28376, WO99/28380, WO99/28391). Given the very small size of the objects observed, the operating method was adapted by using, in the present case, the method of Mie.

The setup used is formed of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600 W ½ inch ultrasound generator type Vibracell sold by Bioblock under the reference M72412).

A quantity of 100 mg of filler to be analyzed is introduced into 30 ml of water. The suspension obtained is introduced into the preparer with 130 ml of water, the rate of circulation being set at its maximum (approximately 3 liters per minute).

At least three consecutive measurements are performed to determine, in accordance with the known Mie calculation method [calculation matrix Malvern 3RHD, established with a complex refractive index (for example n*=2.02+0.1 i for the silicon nitride)], the average initial diameter (by volume) of the agglomerates, $d_v[0]$. The ultrasound generation is then set at a power of 15% (or 15% of the maximum position of the "tip amplitude") in pulse mode, characterized by a succession of sequences of 1 second's ultrasound generation (setting "ON") followed by 3 seconds without ultrasound generation (setting "OFF"). The change in the average diameter by volume $d_v[t]$ as a function of the time "t" is monitored for about 9 minutes with one measurement approximately every 10 seconds. After an induction period (about 3 minutes), it was noted that the reciprocal of the average diameter by volume $1/d_v[t]$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 3 and 9 minutes). It is expressed in $\mu m^{-1}/min$.

I-2. Characterization of the Rubber Compositions

The rubber compositions are characterized, before and after curing, as indicated below.

a) Tensile Tests:

These tests make it possible to determine the elasticity stresses and the properties at break. Unless indicated otherwise, they are effected in accordance with French Standard NF T 46-002 of September 1988. The true secant moduli (i.e. calculated reduced to the real section of the test piece), expressed in MPa, at 10% elongation (moduli marked M10), 100% elongation (moduli marked M100) and 250% elongation (moduli marked M250), are measured in a first elongation (i.e. without an accommodation cycle—the moduli are then marked "M").

The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

Processing the tensile data recorded also makes it possible to trace the curve of the modulus as a function of the elongation (see attached FIG. 2), the modulus used here being the true secant modulus measured in a first elongation (modulus "M").

b) "Bound Rubber" Test:

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, linked with the reinforcing filler during mixing, gives a quantitative indication of the reinforcing activity of the filler in the rubber composition.

Such a method has been described, for example, in French Standard NF T 45-114 (June 1989) applied to the determination of the amount of elastomer bound to the carbon black.

This test, which is well-known to the person skilled in the art for characterizing the quality of reinforcement provided by the reinforcing filler, has been described, for example, in the following documents: Plastics, Rubber and Composites Processing and Applications, Vol. 25, No. 7, p. 327 (1996); Rubber Chemistry and Technology, Vol. 69, p. 325 (1996).

In the present case, the amount of elastomer which cannot be extracted with toluene is measured, after swelling for 15 days of a sample of rubber composition (typically 300–350 mg) in this solvent (for example in 80–100 cm3 of toluene), followed by a 24-hour drying step at 100° C., in a vacuum, before weighing the sample of rubber composition thus treated. Preferably, the above swelling step is carried out at ambient temperature (approximately 20° C.) and protected from light, and the solvent (toluene) is changed once, for example after the first five days' swelling. The amount of "bound rubber" (% by weight) is calculated in known manner by the difference between the initial weight and the final weight of the sample of rubber composition, after making allowance for and eliminating, in the calculation, the fraction of the components which are insoluble by nature, other than the elastomer, which are initially present in the rubber composition.

II. Conditions of Implementation of the Invention

The rubber compositions according to the invention are based on the following constituents: (i) (at least) one diene elastomer, (ii) (at least) one reinforcing inorganic filler and (iii) (at least) one coupling agent providing the bond between this filler and this diene elastomer, said inorganic filler comprising a reinforcing silicon nitride as described in detail hereafter.

Of course, the expression "composition based on" is to be understood to mean a composition comprising the mix and/or the product of reaction in situ of the different base constituents used, some of these base constituents being able to and/or being intended to react together, at least in part, during the different phases of manufacture of the composition, or during the later curing thereof.

II-1. Diene Elastomer

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood in particular to be meant by diene elastomer capable of being used in the compositions according to the invention:

(a)—any homopolymer obtained by polymerization of a conjugated diene monomer having 4 to 12 carbon atoms;

(b)—any copolymer obtained by copolymerization of one or more dienes conjugated together or with one or more vinyl-aromatic compounds having 8 to 20 carbon atoms;

(c)—any ternary copolymer obtained by copolymerization of ethylene, of an a-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—any copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di(C1–C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and from 1% to 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in a dispersion or in solution; they may be coupled and/or starred or alternatively functionalized with a coupling and/or starring or fuctionalizing agent.

Preferred are polybutadienes, and in particular those having a content of 1,2-units of between 4% and 80%, or those having a content of cis-1,4 of more than 80%, polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature ("Tg"—measured in accordance with ASTM Standard D3418-82) of between $-40°$ C. and $-80°$ C., isoprene/styrene copolymers and in particular those having a styrene content of between 5% and 50% by weight and a Tg of between $-25°$ C. and $-50°$ C.

In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between $-20°$ C. and $-70°$ C.

According to a preferred embodiment of the invention, the diene elastomer of the composition according to the invention is selected from the group of highly unsaturated diene elastomers which consists of polybutadienes (BR), synthetic polyisoprenes (IR), natural rubber (NR), butadiene/styrene copolymers (SBR), butadiene/isoprene copolymers (BIR), butadiene/acrylonitrile copolymers (NBR), isoprene/styrene copolymers (SIR), butadiene/styrene/isoprene copolymers (SBIR), and mixtures of these elastomers.

The composition according to the invention is in particular intended for a tread for a tire, be it a new or a used tire (case of retreading).

When such a tread is intended for example for a passenger-car tire, the diene elastomer is preferably an SBR or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between $-20°$ C. and $-55°$ C. is used, this SBR copolymer, which is preferably prepared in solution (SSBR), possibly being used in a mixture with a polybutadiene (BR) having preferably more than 90% cis-1,4 bonds.

When the tread is intended for a utility tire such as a heavy-vehicle tire, the diene elastomer is preferably an isoprene elastomer. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). The isoprene elastomer is preferably natural rubber or a synthetic polyisoprene of the cis-1,4 type. Of these synthetic polyisoprenes, preferably polyisoprenes having a content (mole %) of cis-1,4 bonds greater than 90%, more preferably still greater than 98%, are used. Of course, the diene elastomer may also be formed, in part, of another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Filler

The silicon nitride used as reinforcing inorganic filler may constitute all or only part of the total reinforcing filler, in the latter case associated, for example, with another reinforcing inorganic filler such as silica, or with conventional carbon black.

Preferably, it constitutes the majority, that is to say more than 50%, of the total reinforcing filler, this percentage being expressed here by volume and not by weight, to allow for the significant difference in density between a silicon nitride and a conventional filler of the carbon black or silica type. Advantageously, the reinforcing silicon nitride may constitute the entire reinforcing (inorganic) filler.

In the present application, "reinforcing" filler is generally understood to mean a filler which is capable, on its own, without any other means than an intermediate coupling agent, of reinforcing a rubber composition intended for the manufacture of tires; in other words, an inorganic filler referred to as a "reinforcing" filler is capable of replacing a conventional tire-grade carbon black filler in its reinforcement function.

The composition according to the invention therefore uses, as reinforcing filler, a silicon nitride having the following characteristics:
- (a) a BET specific surface area which is of between 20 and 200 $m^2/g$;
- (b) an average particle size (by mass), $d_w$, of between 10 and 350 nm.

"Silicon nitride" is understood to mean any compound corresponding, apart from any impurities, to the known formula $Si_3N_4$, whatever its form, whether crystalline or amorphous.

For a BET surface area of less than 20 $m^2/g$, although the compositions are easier to work and have a reduced hysteresis, a decline in the breaking properties and a diminished wear resistance in the tire are observed; for BET surface areas greater than 200 $m^2/g$, working in the uncured state becomes more difficult (higher Mooney plasticity) and the dispersion of the filler is adversely affected as a result. For excessively large sizes $d_w$, greater than 350 nm, the particles act like defects which localize stresses and are harmful in terms of wear; sizes $d_w$ which are too small, less than 10 nm, on the other hand, will impair working in the uncured state and the dispersion of the filler during this working.

For all the reasons set forth above, the BET surface area is preferably between 40 and 180 $m^2/g$ and the particle size $d_w$ preferably lies within a range of from 20 to 300 nm, and more particularly from 20 to 250 nm.

The intrinsic dispersibility of a filler can be evaluated using the known ultrasound disagglomeration test described in Section I above, by measuring the disagglomeration rate α of this filler. Preferably, the reinforcing silicon nitride previously described has a rate α which is greater than $1 \times 10^{-3}$ $\mu m^{-1}/min$, measured in the disagglomeration test at 15% power of a 600 W ultrasound probe operating in pulse mode (1 second "ON"/3 seconds "OFF"). Such a preferred characteristic guarantees for this type of product a very good ability firstly to be incorporated into the matrix during mixing with the elastomer and secondly to disagglomerate in order to disperse, in finely divided form, homogenously in the rubber matrix. For such a rate α greater than $1 \times 10^{-3}$ $\mu m^{-1}/min$, it was noted that few micronic agglomerates are observed by optical microscopy reflection on a section of rubber composition prepared in accordance with the rules of the art.

More preferably, in particular when the compositions of the invention are intended for tire treads having low rolling resistance and high wear resistance, the reinforcing silicon nitrides used satisfy at least one of the following characteristics, preferably both:
- a BET surface area within a range from 50 to 170 $m^2/g$;
- a particle size, $d_w$, within a range from 20 to 250 nm.

Furthermore, for even better dispersibility of the reinforcing silicon nitride in the diene rubber matrix, and therefore for optimum reinforcement, it is preferred that its disagglomeration rate α be greater than $4 \times 10^{-3}$ $\mu m^{-1}/min$.

The particles of reinforcing silicon nitride furthermore have good surface reactivity, that is to say a high number of surface hydroxyl functions (—OH) which are reactive with respect to the coupling agent, which is particularly favorable to the reinforcement function performed by the filler, and therefore to the mechanical properties of the rubber compositions of the invention.

The physical state in which the reinforcing silicon nitride may be present is immaterial, whether it be in the form of a powder, microbeads, granules, balls, or any other densified form, provided, of course, that the mode of densification does not adversely affect the essential or preferred characteristics advocated for this filler.

The reinforcing silicon nitride described above may be used on its own or associated with another reinforcing inorganic filler, or even several, for example a silica or an alumina. It will be recalled here that, in contrast to conventional carbon black, "white" filler (sometimes also referred to as "clear" filler) is to be understood to mean any inorganic or mineral filler, whatever its color and its origin (natural or synthetic).

In the case of a silica, preferably a highly dispersible precipitated silica is used, in particular when the invention is used for the manufacture of treads for tires having low rolling resistance; as non-limitative examples of such preferred highly dispersible silicas, mention may be made of the silicas Ultrasil 7000 and Ultrasil 7005 from Degussa, the silicas Zeosil 1165MP, 1135MP and 1115MP from Rhodia, the silica Hi-Sil EZ150OG from PPG, the silicas Zeopol 8715, 8745 and 8775 from Huber, and treated precipitated silicas such as, for example, the aluminum-"doped" silicas described in the aforementioned application EP-A-0 735 088. If a reinforcing alumina is used, this is preferably a highly dispersible alumina such as described in application EP-A-0 810 258 referred to above, for example the aluminas "Baikalox" "A125" or "CR125" (from Baikowski), "APA-100RDX" (from Condea), "Aluminoxid C" (from Degussa) or "AKP-G015" (Sumitomo Chemicals).

The reinforcing silicon nitride, on its own or possibly associated with another reinforcing inorganic filler, may also be used in a blend, i.e. in a mixture, with one or more conventional tire-grade carbon blacks. Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N330, N339, N347, N375.

The quantity of carbon black present in the total reinforcing filler may vary within wide limits, this quantity however preferably being less than the quantity of silicon nitride present in the rubber composition.

In the compositions according to the invention, a carbon black is advantageously used, in association with the reinforcing silicon nitride, in a small proportion, in a preferred amount of between 2 and 20 phr, more preferably within a range from 5 to 15 phr (parts by weight per hundred parts of elastomer). Within the ranges indicated, there is a benefit to be had from the coloring properties (black pigmentation agent) and anti-UV properties of the carbon blacks, without furthermore adversely affecting the typical performance provided by the reinforcing silicon nitride.

Preferably, the amount of total reinforcing filler in the compositions of the invention lies within a range from 20 to 400 phr, more preferably from 30 to 200 phr, as far as the amount of inorganic filler is also concerned. The optimum in fact differs according to the intended applications: in known manner, the level of reinforcement expected for a bicycle tire, for example, is distinctly lower than that required for a tire for a passenger vehicle or for a utility vehicle such as a heavy vehicle. When the compositions of the invention are intended for treads for tires, the amount of reinforcing inorganic filler, and therefore of reinforcing silicon nitride when the latter constitutes the entire reinforcing inorganic filler, is selected to be preferably greater than 50 phr, for example between 50 and 150 phr, more preferably still greater than 60 phr.

By way of examples of reinforcing silicon nitrides liable to be suitable for the rubber compositions of the invention, mention will be made in particular of silicon nitrides obtained in known manner by a $CO_2$ laser CVD (Chemical Vapor Deposition) technique (see for example FR-A-2677558); their synthesis has been described in detail, in particular in the following publication: "*Synthèse de poudres ultrafines par laser*", M. Cauchetier, Le Vide, No. 243, August/September/October (1988).

Another example of reinforcing silicon nitride usable in the compositions according to the invention is the silicon nitride sold by MarkeTech International Inc. (USA, Port Townsend—Wash.) under the reference "NP-S1050".

II-3. Coupling Agent

It is well-known to the person skilled in the art that it is necessary to use, for a reinforcing inorganic filler such as, for example, a silica or a reinforcing alumina, a (white filler/elastomer) coupling agent, also referred to as a bonding agent, the role of which is to produce the bond or "coupling" between the white filler and the elastomer, while facilitating the dispersion of this inorganic filler within the elastomeric matrix.

The reinforcing silicon nitride described previously also requires the use of such a coupling agent in order to perform its function of reinforcing filler in the rubber compositions according to the invention.

"Coupling agent" is more precisely understood to mean an agent capable of establishing a sufficient chemical and/or physical connection between the filler in question and the elastomer; such a coupling agent, which is at least bifunctional, has, for example, the simplified general formula "Y-T-X", in which:

—Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

—X represents a functional group ("X" function) which is capable of bonding physically and/or chemically with the elastomer, for example by means of a sulphur atom;

—T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions usable for the manufacture of tires, the effective bonding or coupling between a reinforcing white filler such as silica and a diene elastomer, such as, for example, organosilanes, in particular polysulphurized alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in patents U.S. Pat. Nos. 3,842,111, 3,873,489, 3,978,103, 3,997,581, 4,002,594, 4,072,701, 4,129,585, or in the more recent patents U.S. Pat. Nos. 5,580,919, 5,583, 245, 5,650,457, 5,663,358, 5,663,395, 5,663,396, 5,674,932, 5,675,014, 5,684,171, 5,684,172, 5,696,197, 5,708,053, 5,892,085, EP-A-1 043 357, which describe such known compounds in detail.

Particularly suitable for implementing the invention, without the definition below being limitative, are symmetrical polysulphurized alkoxysilanes which satisfy the following general formula (I):

in which:

n is an integer from 2 to 8 (preferably from 2 to 5);

A is a divalent hydrocarbon radical (preferably $C_1$–$C_{18}$ alkylene groups or $C_6$–$C_{12}$ arylene groups, more particularly $C_1$–$C_{10}$ alkylenes, notably $C_1$–$C_4$ alkylenes, in particular propylene);

Z corresponds to one of the formulae below:

in which:

the radicals $R^1$, which may or may not be substituted, and may be identical or different, represent a $C_1$–$C_{18}$ alkyl group, a $C_5$–$C_{18}$ cycloalkyl group, or a $C_6$–$C_{18}$ aryl group, (preferably $C_1$–$C_6$ alkyl groups, cyclohexyl or phenyl, in particular $C_1$–$C_4$ alkyl groups, more particularly methyl and/or ethyl).

the radicals $R^2$, which may or may not be substituted, and may be identical or different, represent a $C_1$–$C_{18}$ alkoxyl group or a $C_5$–$C_{18}$ cycloalkoxyl group (preferably $C_1$–$C_8$ alkoxyl groups or $C_5$–$C_8$ cycloalkoxyl groups, more preferably $C_1$–$C_4$ alkoxyl groups, in particular methoxyl and/or ethoxyl).

In the case of a mixture of polysulphurized alkoxysilanes in accordance with Formula (I) above, in particular conventional, commercially available, mixtures, the average value of the "n"s is a fractional number, preferably between 2 and 5, more preferably close to 4. However, the invention may also be implemented advantageously for example with disulphurized alkoxysilanes (n=2).

As polysulphurized alkoxysilanes, mention will be made more particularly of the polysulphides (in particular disulphides, trisulphides or tetrasulphides) of bis-(($C_1$–$C_4$) alkoxyl-($C_1$–$C_4$)alkylsilyl($C_1$–$C_4$)alkyl), such as, for example, the polysulphides of bis(3-trimethoxysilylpropyl) or of bis(3-triethoxysilylpropyl). Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

By way of examples of coupling agents other than the aforementioned polysulphurized alkoxysilanes, mention will be made in particular of the bifunctional polyorganosiloxanes such as described for example in the aforementioned application WO99/02602.

The person skilled in the art will be able to adjust the content of coupling agent in the compositions of the invention, according to the intended application, the nature of the elastomer used and the quantity of reinforcing silicon nitride, supplemented if applicable by any other inorganic filler used as complementary reinforcing filler.

So as to make allowance for the differences in specific surface area and density of the silicon nitrides (and, if applicable, any other associated reinforcing inorganic fillers) which may be used, as well as the molar masses of the coupling agents, it is preferable to determine the optimum amount of coupling agent, in moles per meter squared of reinforcing inorganic filler, for each reinforcing inorganic filler (silicon nitride plus, if applicable, associated complementary inorganic filler) used; this optimum amount is calculated from the weight ratio [coupling agent/reinforcing inorganic filler], the BET surface area of the filler and the molar mass of the coupling agent (referred to as M hereafter), according to the following known equation:

(moles/m$^2$ inorganic filler)=[coupling agent/inorganic filler](1/BET) (1/M)

Preferably, the quantity of coupling agent used in the compositions according to the invention lies between $10^{-7}$ and $10^{-5}$ moles per m$^2$ of reinforcing inorganic filler, i.e. per m$^2$ of reinforcing silicon nitride when the latter is used without an associated reinforcing inorganic filler. More preferably still, the quantity of coupling agent lies between $5\times10^{-7}$ and $5\times10^{-6}$ moles per meter squared of total inorganic filler (silicon nitride plus, if applicable, associated complementary inorganic filler).

Taking into account the quantities expressed above, generally, the amount of coupling agent, reduced to the weight of diene elastomer, will preferably be between 0.1 and 25 phr, more preferably between 0.5 and 20 phr.

The coupling agent used could be grafted beforehand (via the "X" function) on to the diene elastomer of the composition of the invention, the elastomer thus functionalized or "precoupled" then comprising the free "Y" function for the reinforcing silicon nitride. The coupling agent could also be grafted beforehand (via the "Y" function) on to the reinforcing silicon nitride, the filler thus "precoupled" then being able to be bonded to the diene elastomer by means of the free "X" functions. However, it is preferred to use the coupling agent in the free (i.e. non-grafted) state or grafted on to the reinforcing silicon nitride, in particular for reasons of better processing of the compositions in the uncured state.

Finally, there may possibly be associated with the coupling agent an appropriate "coupling activator", that is to say, a body (i.e. a single compound or association of compounds) which, when mixed with this coupling agent, increases the effectiveness of the latter. Coupling activators for polysulphurized alkoxysilanes have for example been described in applications WO00/5300 and WO00/5301, consisting of the association of a substituted guanidine, in particular N,N'-diphenylguanidine (abbreviated to "DPG"), with an enamine or a zinc dithiophosphate. The presence of these coupling activators will make it possible, for example, to reduce the amount of reinforcing inorganic filler due to the improved coupling with the elastomer.

II-4. Various Additives

Of course, the compositions according to the invention contain, in addition to the compounds already described, all or part of the constituents usually used in diene rubber compositions intended for the manufacture of tires, such as plasticizers, pigments, protective agents of the type antioxidants, antiozonants, a cross-linking system based either on sulphur or on sulphur and/or peroxide and/or bismaleimide donors, vulcanization accelerators, vulcanization activators, extender oils, etc. There may also be associated with the reinforcing white filler of the invention, if necessary, a conventional non-reinforcing white filler, such as clays, bentonite, talc, chalk or kaolin.

The rubber compositions according to the invention may also contain, in addition to the aforementioned coupling agents, agents (comprising for example the single Y function) for covering the reinforcing inorganic filler, or more generally processing aids liable, in known manner, owing to an improvement in the dispersion of the reinforcing inorganic filler in the rubber matrix and to a reduction in the viscosity of the compositions, to improve their ability to be worked in the uncured state. These agents, when used, for example, in a preferred amount of between 0.5 and 3 phr, being, for example, alkylalkoxysilanes, (in particular alkyltriethoxysilanes, such as for example 1-octyl-triethoxysilane sold by Degussa-Hüls under the name Dynasylan Octeo, or 1-hexa-decyl-triethoxysilane sold by Degussa-Hüls under the name Si216), polyols, polyethers (for example polyethylene glycols), primary, secondary or tertiary amines (for example trialkanolamines), hydroxylated or hydrolyzable polyorganosiloxanes, for example α,ω-dihydroxypolyorganosiloxanes (in particular α,ω-dihydroxy-polydimethylsiloxanes).

II-5. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature (Tmax) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated. Such phases have been described for example in the aforementioned applications EP-A-0 501 227, EP-A-0 735 088, EP-A-0 810 258, WO00/05300 or WO00/05301.

The manufacturing process according to the invention is characterized in that at least the reinforcing filler and the coupling agent are incorporated by kneading in the diene elastomer during the first, so-called non-productive, phase, that is to say that at least these different base constituents are introduced into the mixer and kneaded thermomechanically, in one or more stages, until a maximum temperature of between 110° C. and 190° C., preferably of between 130° C. and 180° C., is reached.

By way of example, the first (non-productive) phase is effected in a single thermomechanical step during which all the base constituents necessary, any complementary covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion, in the elastomeric matrix, of the reinforcing filler and its coupling agent. The total duration of the kneading, in this non-productive phase, is preferably between 2 and 20 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered, for example in the form of a film or a sheet, in particular for characterization in the laboratory, or alternatively extruded, in order to form for example a rubber profiled element used for manufacturing semi-finished products such as treads, crown plies, sidewalls, carcass plies, beads, protectors, inner tubes or airtight internal rubbers for tubeless tires.

The vulcanization (or curing) is carried out in known manner at a temperature generally between 130° C. and 200° C., under pressure, for a sufficient time which may vary, for example, between 5 and 90 minutes, depending, in particular, on the curing temperature, the vulcanization system adopted, the vulcanization kinetics of the composition in question or alternatively the size of the tire.

The vulcanization system proper is preferably based on sulphur and a primary vulcanization accelerator, in particular an accelerator of the sulphenamide type. To this basic vulcanization system there are added, incorporated during the first, non-productive phase and/or during the productive phase, various known secondary accelerators or vulcanization activators such as zinc oxide, stearic acid, guanidine derivatives (in particular diphenylguanidine), etc. The sulphur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the rubber compositions previously described, both in the "uncured" state (i.e. before curing) and in the "cured" or vulcanized state (i.e. after cross-linking or vulcanization).

Of course, the compositions according to the invention may be used alone or in a blend (i.e. in a mixture) with any other rubber composition usable for manufacturing tires.

III. Examples of Embodiment of the Invention

III-1. Fillers Used

The characteristics of the fillers used in the following example are set forth in Table 1.

Filler A is a tire-grade carbon black (N234), used conventionally in treads for tires. Filler B is a coarser carbon black (N550) used conventionally in tire carcasses. Filler C is a conventional silica of high specific surface area (BET approximately 160 m$^2$/g), a reference inorganic filler for the reinforcement of the treads of "Green Tires" (silica "Zeosil 1165 MP" from Rhodia). Finally, filler D is a reinforcing silicon nitride, that is to say, one usable in the compositions according to the invention (characteristics a and b met).

Filler D is available commercially (from MarkeTech International Inc.—reference "NP-S1050").

It will be noted that filler D has a particle size $d_w$ very much less than that of filler C. The BET surface area of the silicon nitride D is close to that of the silica C tested. Its disagglomeration rate $\alpha$ is advantageously very high (greater than $4 \times 10$–3 $\mu m^{-1}$/min). As the ability of carbon blacks to disagglomerate is known to be excellent, very distinctly greater than that of the other fillers, it is not necessary to measure the rate $\alpha$ for fillers A and B.

The filler E is a conventional non-reinforcing silicon nitride. It is available commercially (from INTERCHIM under the reference 0429429, batch K11J11)

Figure 1:
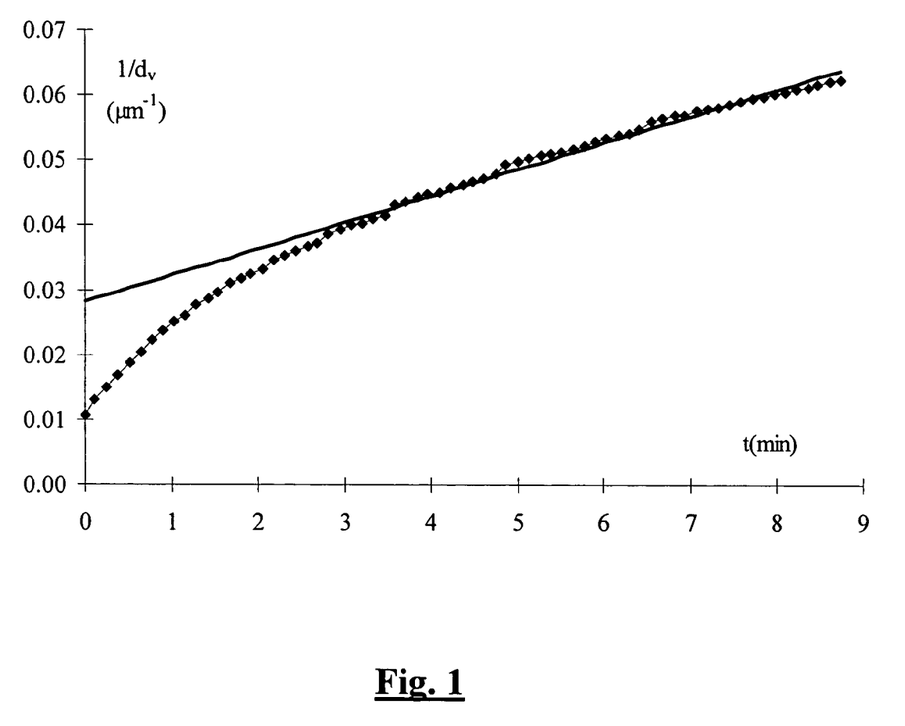
FIG. 1 shows a curve of the change in the size of the agglomerates during ultrasound generation for a filler according to the invention, from which curve the disagglomeration rate α is determined.

FIG. 1 reproduces the curve of change [$1/d_v(t)=f(t)$] of the size of the agglomerates, recorded in the ultrasound disagglomeration test, for filler D. It can be clearly seen in this figure that the first point recorded corresponds to the measurement of the initial average diameter $d_v(0)$, followed (after actuation of the ultrasound probe) by progressive passage to stable disagglomeration conditions during which the reciprocal of "$d_v$" varies substantially linearly with the time "t"; the recording of the data is stopped here after about 8 to 9 minutes. The disagglomeration rate $\alpha$ is deduced from this by elementary calculation of linear regression, performed by the calculator of the granulometer, within the zone of stable disagglomeration conditions (between 3–4 min and 8–9 min).

III-2. Preparation of the Compositions

The compositions tested hereafter are prepared in known manner, as follows: the diene elastomer (or the mixture of diene elastomers, if applicable) is introduced into an internal mixer filled to 80%, the initial tank temperature of which is approximately 90° C.; then, after an appropriate kneading time, for example of the order of 30 seconds, all the other ingredients are added, including the filler and the associated coupling agent, with the exception of the vulcanization system. Thermomechanical working of a duration of about 16 minutes is then performed, with an average blade speed of 70 rpm, until a dropping temperature of about 140° C. is obtained.

The mixture thus obtained is recovered, it is cooled and then the vulcanization system (sulphur and sulphenamide-type primary accelerator) is added on an external mixer (homo-finisher) at 30° C., by mixing everything (productive phase) for a suitable time, of between 5 and 12 minutes depending on the case.

The compositions thus obtained are then calendered in the form of plates (thickness of 2 to 3 mm) of rubber in order to measure their mechanical properties. Vulcanization (curing) is carried out at 150° C. for 40 min, under pressure.

In all the following tests, the reinforcing silicon nitride is present, in the compositions according to the invention, in a preferred amount greater than 70 phr; it furthermore constitutes all or more than 90% by weight of all the reinforcing filler, a minority fraction (less than 10%) of the latter possibly being formed by carbon black.

III-3. Test

The aim of this test is to show that a reinforcing silicon nitride such as described above can be a reinforcing inorganic filler.

For this, four diene rubber compositions usable for the manufacture of tires, in particular of treads for passenger-car tires, are compared. The diene elastomer is an SSBR comprising 27% by mass of styrene, the polybutadiene units of which being 24% 1,2-polybutadiene units and 46% trans-1,4 polybutadiene units.

These four compositions are identical, apart from the following differences:
composition C-1 (control): filler A (carbon black, N234)
composition C-2 (control): filler B (carbon black, N550)
composition C-3 (control): filler C (silica), with coupling agent (TESPT)
composition C-4: filler according to the invention ($Si_3N_4$), with coupling agent (TESPT)
composition C-5 (control): filler E, $Si_3N_4$ not in accordance with the invention, with coupling agent (TESPT)

The carbon black selected for the control composition C-1 is a tire-grade black of very great reinforcing ability, used conventionally for reinforcing treads for passenger-vehicle tires.

The carbon black selected for the control composition C-2 is a tire-grade black usually used in a tire carcass.

In compositions C-4 and C-5, the silicon nitride is used in equal volume with the carbon black (composition C-1). As for the coupling agent TESPT (Si69), it was introduced at a rate corresponding to total surface covering of the 71 phr of silicon nitride, or approximately $9.27 \times 10^{-7}$ mole/m² of silicon nitride for the composition C-4 and of the 80 phr of silicon nitride, or approximately $9.27 \times 10^{-7}$ mole/m² of silicon nitride for composition C-5. The compositions C-1 and C-2 which serve here as references do not require, as is known, coupling agent since they are reinforced with carbon black.

Figure 2:
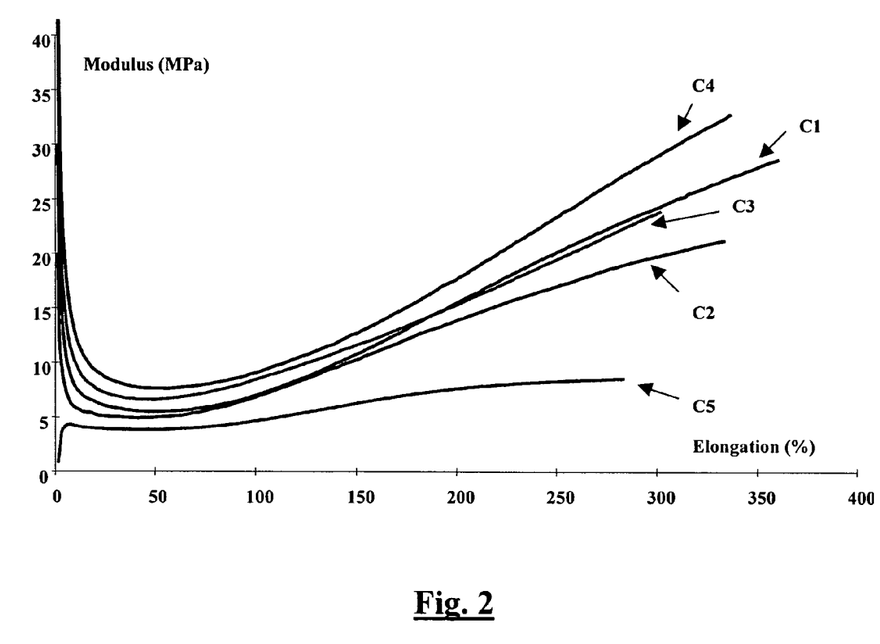
FIG. 2 shows a curve of the variation of modulus as a function of the elongation for a diene rubber composition, according to the invention.

Tables 2 and 3 show in succession the formulation of the different compositions (Table 2 —amount of the different products expressed in phr), and their properties before and after curing at 150° C. for 40 minutes (Table 3). FIG. 2 shows the curves of true secant modulus "M" (in MPa) as a function of the elongation (in %); these curves are marked C1 to C5, and correspond to rubber compositions C-1 to C-5 respectively.

A study of the different results shows that the composition of the invention has after curing a level of reinforcement greater than that of the control compositions, with higher moduli, in particular at high deformations (M100 and M250), a ratio M250/M100 which is similar, substantially higher measurements in the "bound rubber" test, all indications of reinforcement well known to the person skilled in the art which demonstrate the remarkable reinforcing activity of filler D, in the presence of the coupling agent. The attached FIG. 2 confirms the above observations. Such results which are as noteworthy as they are surprising, could not be expected by a person skilled in the art.

It will furthermore be noted that with a conventional silicon nitride of coarse size as the sole filler, filler E, no reinforcing effect is observed: a zero measurement in the "bound rubber" test, and a very low ratio M250/M100. Furthermore, the composition C-5 has a very low breaking stress, which is evidence of virtually non-existent cohesion in the elastomeric mix and therefore of the absence of reinforcement.

In conclusion, the specific silicon nitride of the composition according to the invention imparts to the latter highly advantageous properties, in particular a remarkable reinforcement ability and therefore wear resistance which is at least equal to if not greater than that obtained with carbon black or a conventional HD silica, which was unknown hitherto with the silicon nitrides conventionally used in the rubber compositions for tires of the prior art.

The industrial processing and the curing kinetics of the compositions of the invention, which are unexpectedly comparable to those of conventional rubber compositions, make the reinforcing silicon nitrides previously described a very advantageous alternative to using reinforcing inorganic fillers such as HD silicas.

The invention can thus be applied preferably in rubber compositions usable for the manufacture of treads for tires which have both low rolling resistance and high wear resistance, in particular when these treads are intended for tires for passenger vehicles or for industrial vehicles of the heavy-vehicle type.

TABLE 1

|  | filler: | | | | |
| --- | --- | --- | --- | --- | --- |
|  | A (black N234) | B (black N550) | C (silica) | D ($Si_3N_4$) | E ($Si_3N_4$) |
| He Density (g/ml) | 1.99 | 1.93 | 2.1 | 2.84 | 3.18 |
| BET surface area (m²/g) | 126 | 40 | 160 | 144 | 6 |
| $d_w$ (nm) | 69 | 210 | 59 | 27 | * |
| $\alpha$(μm⁻¹/min) | — | — | 0.00127 | 0.00409 | ** |

* Unable to measure: the coarse-size silicon nitride settles too quickly.
** measurement of the disagglomeration rate pointless on such a coarse filler.

TABLE 2

|  | Composition No. | | | | |
| --- | --- | --- | --- | --- | --- |
|  | C-1 | C-2 | C-3 | C-4 | C-5 |
| SSBR (1) | 100 | 100 | 100 | 100 | 100 |
| filler A | 50 | — | — | — | — |
| filler B | — | 45 | — | — | — |
| filler C | — | — | 52.5 | — | — |
| filler D | — | — | — | 71 | — |
| filler E | — | — | — | 13 | 80 |
| coupling agent (2) | — | — | 4.2 | 5.11 | 0.24 |
| DPG | — | — | 1.05 | — | — |
| ZnO | 2.5 | 2.5 | 2.5 | 2.5 | 2.5 |
| stearic acid | 2 | 2 | 2 | 2 | 2 |
| antioxidant (3) | 1.9 | 1.9 | 1.9 | 1.9 | 1.9 |
| sulphur | 1.5 | 1.5 | 1.5 | 1.5 | 1.5 |
| accelerator (4) | 2.5 | 2.5 | 2.5 | 2.5 | 2.5 |

(1) solution SBR with 24% of 1,2-polybutadiene units; 46% of 1,4-polybutadiene units, 27% styrene; Tg = −48° C.; (Tg determined on the dry elastomer)
(2) TESPT ("Si69" from Degussa-Hüls);
(3) N-1,3-dimethylbutyl-N-phenylparaphenylenediamine ("Santoflex 6-PPD" from Flexsys);
(4) N-cyclohexyl-2-benzothiazylsulphenamide ("Santocure CBS" from Flexsys).

TABLE 3

| | Composition No. | | | | |
|---|---|---|---|---|---|
| | C-1 | C-2 | C-3 | C-4 | C-5 |
| M10 (MPa) | 7.79 | 5.87 | 10.02 | 12.56 | 4.2 |
| M100 (MPa) | 6.99 | 6.90 | 8.49 | 9.08 | 4.7 |
| M250 (MPa) | 20.15 | 17.02 | 19.51 | 23.4 | 8.3 |
| M250/M100 | 2.9 | 2.5 | 2.3 | 2.6 | 1.8 |
| breaking stress (MPa) | 21.37 | 15.92 | 17.46 | 24.08 | 6.1 |
| elongation at break (%) | 345 | 324 | 296 | 324 | 267 |
| "Bound rubber" (%) | 23.6 | 13.8 | 21.7 | 41.3 | 0 |

The invention claimed is:

1. A rubber composition based on at least one diene elastomer, at least one reinforcing inorganic filler, and at least one coupling agent providing a bond between the inorganic filler and the elastomer, said reinforcing inorganic filler comprising a silicon nitride having the following characteristics:
   (a) a BET specific surface area of between 20 and 200 m²/g; and
   (b) an average particle size (by mass), $d_w$, of between 10 and 350 nm.

2. The composition according to claim 1, wherein the quantity of reinforcing inorganic filler is between about 30 and 200 parts by weight per hundred parts of elastomer.

3. The composition according to claim 2, wherein the amount of silicon nitride is greater than about 50 phr.

4. The composition according to claim 1, wherein the reinforcing inorganic filler comprises, in addition to the silicon nitride, silica or alumina as a reinforcing inorganic filler.

5. The composition according to claim 1, wherein a carbon black is also present as reinforcing filler.

6. The composition according to claim 5, wherein the carbon black is present in an amount of between about 2 and 20 phr.

7. The composition according to claim 1, wherein the BET surface area of the silicon nitride lies between 40 and 180 m²/g.

8. The composition according to claim 1, wherein the $d_w$ of the silicon nitride lies within a range from 20 to 300 nm.

9. The composition according to claim 1, wherein the silicon nitride has a disagglomeration rate α, measured in the ultrasound disagglomeration test at 15% power of a 600 W ultrasound probe operating in pulse mode (1 second "ON"/3 seconds "OFF") which is greater than $1\times10^{-3}$ μm⁻¹/min.

10. The composition according to claim 9, wherein the silicon nitride satisfies at least one of the following characteristics:
   its BET surface area lies within a range from 50 to 170 m²/g;
   its particle size $d_w$ lies within a range from 20 to 250 nm;
   its rate α is greater than $4\times10^{-3}$ μm⁻¹/min.

11. The composition according to claim 1, wherein the coupling agent is a polysulphurized alkoxysilane.

12. The composition according to claim 1, wherein the diene elastomer is selected from the group consisting of polybutadienes, synthetic polyisoprenes, natural rubber, butadiene/styrene copolymers, butadiene/isoprene copolymers, butadiene/acrylonitrile copolymers, isoprene/styrene copolymers, butadiene/styrene/isoprene copolymers and mixtures of these elastomers.

13. The composition according to claim 12, wherein the diene elastomer is a butadiene/styrene copolymer (SBR) having a styrene content of between 20% and 30% by weight, a content of vinyl bonds of the butadiene fraction of between 15% and 65%, a content of trans-1,4 bonds of between 20% and 75% and a glass transition temperature of between −20° C. and −55° C.

14. The composition according to claim 13, wherein the SBR is prepared in solution (SSBR).

15. The composition according to claim 13, wherein the SBR is used in a mixture with a polybutadiene.

16. A process for obtaining a rubber composition usable for the manufacture of tires, which comprises preparing a mixture comprising (i) at least one diene elastomer, (ii) at least one reinforcing inorganic filler and (iii) at least one coupling agent providing a bond between the inorganic filler and the elastomer, said reinforcing inorganic filler comprising a silicon nitride having the following characteristics:
   (a) a BET specific surface area of between 20 and 200 m²/g; and
   (b) an average particle size (by mass), $d_w$, of between 10 and 350 nm and thermomechanically kneading said mixture until a maximum temperature of between about 110° C. and 190° C. is reached.

17. The process according to claim 16, wherein the BET surface area of the silicon nitride lies between 40 and 180 m²/g.

18. The process according to claim 16, wherein the size $d_w$ of the silicon nitride lies within a range from 20 to 300 nm.

19. The process according to claim 16, wherein the silicon nitride has a disagglomeration rate α, measured in the ultrasound disagglomeration test at 15% power of a 600 W ultrasound probe operating in pulse mode (1 second "ON"/3 seconds "OFF") which is greater than $1\times10^{-3}$ μm⁻¹/min.

20. The process according to claim 16, wherein the silicon nitride satisfies at least one of the following characteristics:
   its BET surface area lies within a range from 50 to 170 m²/g;
   its particle size $d_w$ lies within a range from 20 to 250 nm;
   its rate α is greater than $4\times10^{-3}$ μm⁻¹/min.

21. The process according to claim 16, wherein the quantity of reinforcing inorganic filler is between about 30 and 200 parts by weight per hundred parts of elastomer.

22. The process according to claim 21, wherein the silicon nitride is incorporated in an amount greater than 50 phr.

23. The process according to claim 16, wherein the reinforcing inorganic filler comprises, in addition to the silicon nitride, silica or alumina as a reinforcing inorganic filler.

24. The process according to claim 16, wherein a carbon black is also incorporated as a reinforcing filler.

25. The process according to claim 24, wherein the carbon black is incorporated in an amount of between about 2 and 20 phr.

26. The process according to claim 16, wherein the diene elastomer is selected from the group consisting of polybutadienes, synthetic polyisoprenes, natural rubber, butadiene/styrene copolymers, butadiene/isoprene copolymers, butadiene/acrylonitrile copolymers, isoprene/styrene copolymers, butadiene/styrene/isoprene copolymers and mixtures of these elastomers.

27. The process according to claim 26, wherein the diene elastomer is a butadiene/styrene copolymer (SBR) having a styrene content of between 20% and 30% by weight, a content of vinyl bonds of the butadiene fraction of between 15% and 65%, a content of trans-1,4 bonds of between 20% and 75% and a glass transition temperature of between −20° C. and −55° C.

28. The process according to claim 27, wherein the SBR is prepared in solution (SSBR).

29. The process according to claim 27, wherein the SBR is used in a mixture with a polybutadiene.

30. The process according to claim 16, wherein the maximum kneading temperature lies between about 130° C. and 180° C.

31. A process for reinforcing a diene rubber composition, wherein a silicon nitride having the following characteristics is incorporated in the composition in the uncured state by thermomechanical kneading:
(a) a BET specific surface area of between 20 and 200 m²/g;
(b) an average particle size (by mass), $d_w$, of between 10 and 350 nm.

32. The process according to claim 31, wherein the BET surface area of the silicon nitride lies between 40 and 180 m²/g.

33. The process according to claim 31, wherein the $d_w$ of the silicon nitride lies within a range from 20 to 300 nm.

34. The process according to claim 31, wherein the silicon nitride has a disagglomeration rate α, measured in the ultrasound disagglomeration test at 15% power of a 600 W ultrasound probe operating in pulse mode (1 second "ON"/3 seconds "OFF") which is greater than $1 \times 10^{-3}$ μm$^{-1}$/min.

35. The process according to claim 34, wherein the silicon nitride satisfies at least one of the following characteristics:
its BET surface area lies within a range from 50 to 170 m²/g;
its particle size $d_w$ lies within a range from 20 to 250 nm;
its rate α is greater than $4 \times 10^{-3}$ μm$^{-1}$/min.

36. The process according to claim 31, wherein the silicon nitride is incorporated in an amount greater than 50 phr.

37. A rubber article comprising a composition according to claim 1.

38. A semi-finished product for tires, comprising a rubber composition according to claim 1, this product being selected from the group comprising treads, underlayers for these treads, crown plies, sidewalls, carcass plies, beads, protectors, inner tubes and airtight internal rubbers for tubeless tires.

39. A tire comprising a rubber composition according to claim 1.

40. A tire tread based on a rubber composition according to claim 1.

* * * * *